Nov. 27, 1934.  S. KROLL ET AL  1,982,309
VEHICLE WHEEL
Filed April 27, 1934
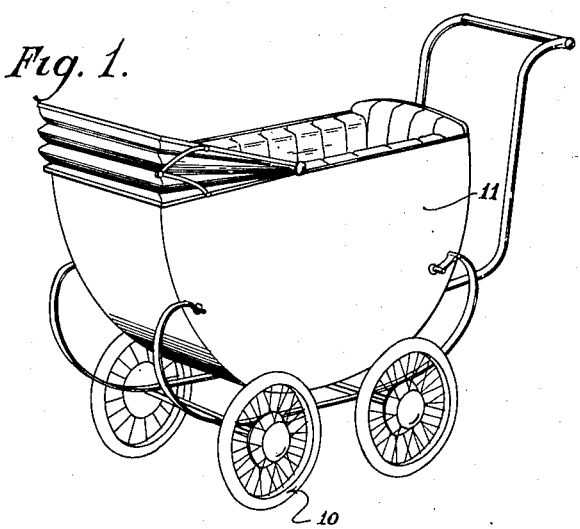
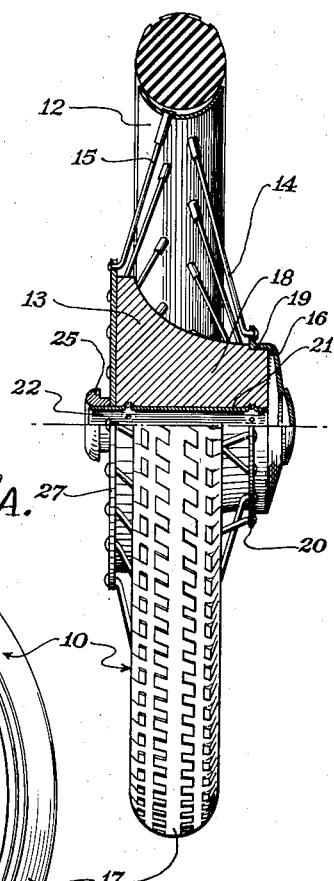
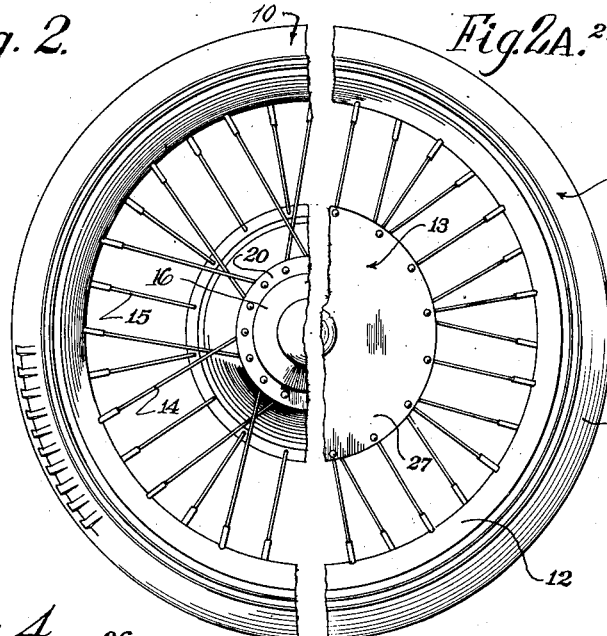
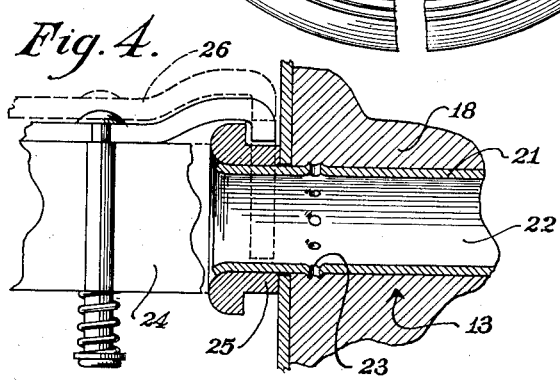
Samuel Kroll
and
Nathan Kroll
INVENTORS
BY Threedy and Cannon
THEIR ATTORNEYS Patented Nov. 27, 1934

1,982,309

UNITED STATES PATENT OFFICE 1,982,309

VEHICLE WHEEL

Samuel Kroll and Nathan Kroll, Chicago, Ill.

Application April 27, 1934, Serial No. 722,680

3 Claims. (Cl. 301—55)

This invention relates to a vehicle wheel.

It is an object of this invention to provide an improved vehicle wheel which is relatively simple and inexpensive in construction and efficient in use.

Other objects of the invention are: to provide a new and improved vehicle wheel, especially adapted for baby carriages and coaches; to provide a new and improved vehicle wheel for baby carriages and the like which is stronger in construction, neater in appearance, and easier to construct and repair than those of the prior art; to provide a vehicle wheel in which the spokes may be readily assembled or laced and readily replaced in case of rupture or breakage; in which the hub structure acts as an effective support for the spokes; in which the anti-friction bearing in the hub of the wheel is mounted in a novel manner in a relatively large wooden block which forms the body of the hub structure thereby giving the hub structure of the wheel a rather massive, strong, solid, heavy and sturdy, but at the same time, neat and attractive appearance; to provide a wheel for baby carriages and coaches and the like in which the spokes are radially much shorter in length than they are in the conventional wheel structure, thereby imparting greater strength and resistance to stresses and strains than is possessed by the prior art wheels; to provide a wheel which has its greatest strength and resistance to stresses and strains on its axially inner side where the greatest load is carried by and exerted upon the wheel in use; to provide a wheel structure in which the spokes may be readily adjusted and centered radially; to provide a vehicle wheel for baby carriages and the like which prevents the spokes from becoming loose and rattling and which prevents faulty lacing of the spokes; which is simple in construction; and in which the hub cap not only functions as such but even serves as a support or anchor for the radially inner ends of the axially outer row of spokes embodied in the wheel.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a perspective view showing a preferred form of the new wheel structure applied to a typical baby carriage or coach;

Fig. 2 is a fragmentary elevational view of a preferred form of one of the new wheels, as seen from the axially outer side of the wheel;

Fig. 2A is a fragmentary elevational view of the wheel shown in Fig. 2 as seen from the axially inner side of the same;

Fig. 3 is a view, partly, that is, one fourth in section, looking at the wheel in upright position and from its peripheral surface; and Fig. 4 is a sectional detail view of a part of the hub structure of the wheel.

A preferred embodiment of the new wheel is shown in the drawing, is indicated generally therein at 10, and is shown in conjunction with a typical baby carriage or coach 11.

The new wheel comprises a felloe 12, bearing a rubber tire 17, a hub structure generally indicated at 13, an axially outer row of wire spokes 14 and an axially inner row of wire spokes 15 extending between and anchored to the felloe 12 and the hub structure 13.

The hub structure 13 comprises a substantially frusto-conical body or block 18, which is preferably made of relatively light material such, for example, as wood. Formed in the axially outer end of this body or block 18 is an annular rabbet or under-cut groove 19 and pressed or frictionally fitted onto the body 18 over the grooved portion 19 thereof is the hub cap 16 which has an annular flange 20 formed on its axially inner side and to which the axially outer row of spokes 14 are attached or anchored at their radially inner ends.

Extending axially through the center of the hub body 18 is a cylindrical bore 21 in which is arranged a cylindrical metal bearing 22 of Babbitt or other suitable metal adapted to receive the end portion of the axle 24 and held in place in the core or body 18 of the hub structure by means of an annular row of barbs or penetrating points 23 (Fig. 4) struck out from the bearing 22 upon its radially outer side; the axially outer end of the bearing 22 having a flanged bushing 25 fitted thereon and adapted to coact with a latch element 26 to detachably latch the wheel 10 to the axle 24 (Fig. 4).

Rotatably mounted upon, that is, "floating" on the bearing 22 between the flanged bushing 25 and the axially inner and larger end or face of the hub body 18, with which face it is substantially co-extensive in size or area, is an annular plate or disc 27 to which the radially inner ends of the axially inner row of spokes 15 are attached or anchored.

In constructing the new wheel structure the hub cap 16 is pressed or frictionally fitted upon the axially outer and smaller end portion of the wooden body 18; the disc or plate 27 is arranged in position between the inner and larger face of the hub core 18 and the flanged bushing 25, and the axially outer row of spokes 14 are laced or anchored to the felloe 12 and to the flange 20 of the hub cap 16; the axially inner row of spokes 15 being laced or anchored to the felloe 12 and to the disc 27. During the operation of lacing or anchoring the spokes 15 to the felloe 12 and to the disc 27 the latter may be rotated upon the bearing 22 so as to true the axially inner row of spokes 15 radially and likewise, the axially outer row of spokes 14 may be trued or radially centered by manipulating the hub body 18 and hub cap 16 relative to the disc 27, thus assuring that the spokes will be in their correct positions radially relative to the felloe 12 and hub structure 13 and not distorted or twisted.

It is to be noted that in the new wheel the axially inner spokes 15 are relatively much shorter in length than the axially outer spokes 14, and will, therefore, offer greater resistance to bending under load where the load and bending stress are greatest, that is, upon the axially inner side of the wheel. It is also to be noted that by reason of the relatively great diameter of the hub body 18, compared to the overall diameter of the wheel, both the spokes 14 as well as the spokes 15 are relatively much shorter in length than are the spokes of conventional baby carriage wheels, thus giving the new wheel greater strength and resistance to crushing and bending loads and stresses.

It is likewise to be noted that the new wheel while having a hub structure which, while it appears massive and relatively heavy, is in reality light but very strong and neat and attractive in appearance; that both rows of spokes 14 and 15 are readily accessible for the purpose of replacement, tightening or centerizing and therefore may readily be replaced if damaged or broken, and adjusted or centered in their correct radial positions; and that the hub cap 16 not only functions as a hub cap but also serves as an anchor or support for the spokes 14.

While we have illustrated and described the preferred form of construction for carrying our invention into effect, this is capable of variation and modification, without departing from the spirit of the invention. We, therefore, do not wish to be limited to the precise details of construction set forth, but desire to avail ourselves of such variations and modifications as come within the scope of the appended claims.

Having thus described our invention what we claim as new and desire to protect by Letters Patent is:

1. A vehicle wheel, comprising: a felloe; a hub structure including a member providing an axle-bearing surface; a substantially frusto-conical body having said bearing member extended axially therethrough; a disc rotatably mounted upon said bearing member at the larger axial end or face of said body and substantially co-extensive in area with said end or face; a hub cap mounted upon said body at the opposite and smaller end thereof; and spokes; said spokes having attachment at their radially outer ends to said felloe; certain of said spokes having attachment at their radially inner ends to said disc and the remaining ones of said spokes having attachment at their radially inner ends of said hub cap.

2. A vehicle wheel, comprising: a felloe; a hub structure including a member providing an axle-bearing surface; a body having said bearing member extended axially therethrough; a disc rotatably mounted upon said bearing member at the axially inner end of said body; a hub cap mounted upon said body at the axially outer end of the latter; and spokes; said spokes having attachment at their radially outer ends to said felloe; certain of said spokes having attachment at their radially inner ends to said disc and the remaining ones of said spokes having attachment at their radially inner ends to said hub cap.

3. A vehicle wheel, comprising: a felloe; a hub structure including a substantially frusto-conical body having a cylindrical bore extending axially and centrally therethrough; an axle-bearing member mounted in said bore; a disc rotatably mounted upon said bearing member at the axially inner and larger end or face of said body and substantially co-extensive in area with said face; a hub cap mounted upon said body at the axially outer and smaller end or face of the latter; said hub cap closing the axially outer end of said bore and being substantially co-extensive with the small end or face of said body; and spokes; said spokes having attachment at their radially outer ends to said felloe; certain of said spokes having attachment at their radially inner ends to said disc and the remaining ones of said spokes having attachment at their radially inner ends to said hub cap.

SAMUEL KROLL.
NATHAN KROLL.